(12) United States Patent
Boberski

(10) Patent No.: US 11,610,263 B2
(45) Date of Patent: *Mar. 21, 2023

(54) INTEREST RATE SWAP COMPRESSION MATCH ENGINE

(71) Applicant: Chicago Mercantile Exchange Inc., Chicago, IL (US)

(72) Inventor: David Boberski, Westport, CT (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 565 days.

This patent is subject to a terminal disclaimer.

(21) Appl. No.: 13/921,776

(22) Filed: Jun. 19, 2013

(65) Prior Publication Data

US 2013/0282554 A1    Oct. 24, 2013

Related U.S. Application Data

(63) Continuation of application No. 13/428,808, filed on Mar. 23, 2012, now Pat. No. 8,494,953.

(51) Int. Cl.
G06Q 40/04    (2012.01)

(52) U.S. Cl.
CPC .................. G06Q 40/04 (2013.01)

(58) Field of Classification Search
CPC ........ G06Q 40/00; G06Q 40/02; G06Q 40/04; G06Q 40/025; G06Q 20/023
USPC ..................................................... 705/35–37
See application file for complete search history.

(56) References Cited

U.S. PATENT DOCUMENTS

| 6,304,858 | B1 * | 10/2001 | Mosier | G06Q 30/0601 |
| | | | | 705/35 |
| 7,801,810 | B2 | 9/2010 | Glinberg et al. | |
| 7,870,060 | B2 * | 1/2011 | Barker | G06Q 40/08 |
| | | | | 705/37 |

(Continued)

FOREIGN PATENT DOCUMENTS

| CA | 2587177 A1 * | 11/2008 | ............ G06Q 40/00 |
| WO | WO-2012024504 A2 * | 2/2012 | ............ G06Q 40/04 |

OTHER PUBLICATIONS

Federal Register, vol. 76, 216 (2011).*

(Continued)

*Primary Examiner* — Richard C Weisberger
(74) *Attorney, Agent, or Firm* — Lempia Summerfield Katz LLC

(57) ABSTRACT

The disclosed embodiments relate to a system for trading using a central counterparty which allows market participants to minimize risk and/or transactional fees associated with a portfolio of bilateral positions without substantially altering a risk profile thereof. In particular, the disclosed embodiments allow a market participant holding a portfolio of heterogeneous bilateral positions, such as positions in interest rate swap ("IRS") contracts, to net together similar but not identical positions within their portfolio, thereby reducing margin requirements and/or transaction fees, according to criteria specified by the market participant, and which may be different from criteria specified by other market participants, wherein the overall risk exposure desired by the market participant in entering into the positions remains substantially unchanged as does the desired overall risk exposure of the counterparty market participants to those positions.

18 Claims, 7 Drawing Sheets

(56) References Cited

U.S. PATENT DOCUMENTS

| | | | |
|---|---|---|---|
| 7,930,245 B2 | 4/2011 | Glinberg et al. | |
| 7,987,126 B2* | 7/2011 | Connors | 705/35 |
| 8,010,441 B2* | 8/2011 | Brouwer | G06Q 40/025 |
| | | | 705/37 |
| 8,751,372 B1* | 6/2014 | Friedman | G06Q 40/04 |
| | | | 705/37 |
| 2005/0187855 A1* | 8/2005 | Brennan | G06Q 40/06 |
| | | | 705/37 |
| 2007/0192221 A1* | 8/2007 | Sandor | G06Q 40/00 |
| | | | 705/35 |
| 2007/0244788 A1* | 10/2007 | Ferris | G06Q 40/06 |
| | | | 705/36 R |
| 2011/0161244 A1* | 6/2011 | Iyer | G06Q 40/04 |
| | | | 705/37 |

OTHER PUBLICATIONS

Part II Commodity Futures Trading Commission 17 CFR Parts 1, 21, 39 et al. Derivatives Clearing Organization General Provisions and Core Principles; 2011.*

RE: CFTC Regulation 40.6(a) Certification. CME Rule 90008 (IRS Coupon Blending) CME/CBOT/NYMEX Submission No. 14-157 2014.*

Maximizing Interest Rate Portfolio Compression Publication info: Derivatives Week Euromoney Institutional Investor PLC. (Mar. 26, 2012) (Year: 2012).*

IRS Netting and Blending Compression Overview Clearing the Wayforward Q4 2019.*

"The Commodity Futures Trading Commission Holds a Meeting of the Technology Advisory Committee", Jun. 22, 2012, Political Transcript Wire, Journal Cose: PTTW.

* cited by examiner

INTEREST RATE SWAP COMPRESSION MATCH ENGINE

RELATED APPLICATIONS

This application is a continuation under 37 CFR § 1.53(b) of U.S. patent application Ser. No. 13/428,808 filed Mar. 23, 2012 now U.S. Pat. No. 8,494,953 B1, the entire disclosure of which is hereby incorporated by reference.

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

An interest rate futures contract, also referred to as an interest rate future, is a futures contract having an underlying instrument/asset that pays interest, for which the parties to the contract are a buyer and a seller agreeing to the future delivery of the interest bearing asset, or a contractually specified substitute. Such a futures contract permits a buyer and seller to lock in the price, or in more general terms the interest rate exposure, of the interest-bearing asset for a future date.

An interest rate swap ("IRS") is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Another common form of IRS, knows as an overnight index swap, exchanges at its termination a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap.

An interest rate swap futures contract is one in which the underlying instrument is an interest rate swap. As such, an interest rate swap futures contract permits "synthetic" exposure to the underlying interest rate swap, i.e., without entailing actual ownership of the underlying IRS.

In a typical futures trading environment, the standardization of futures contracts and the nature of the central counterparty based trading system allows an Exchange, or market participant thereof, to net together offsetting positions in the same contract for the purpose of reducing the margin requirement to reflect the reduced risk of loss of such positions and/or to outright consolidate positions to reduce the size of the portfolio and/or reduce transaction fees therefore. As the Exchange, being a central counterparty to all transactions, ensures that each counter-party is not at risk of loss due to the default of the other party, such netting and consolidation by one market participant does not affect the positions and risk undertaken by another participant.

In the case of IRS contracts, however, the variability in the characteristics of positions which may exist in any given portfolio, such as the maturity date, coupon, etc. makes it difficult to identify suitable positions for netting though, for example, such positions, though not identical, may exist which are similar enough as to represent a reduced risk of loss meriting a reduction in the margin requirement. Further complicating this process is the bilateral nature of an IRS contract where a particular position of one party is coupled with a counter position of a counter-party thereto. Further, as described above, positions in IRS contracts, and in particular, various combinations of positions therein, are typically undertaken to serve particular economic purposes, such as to achieve a particular risk exposure or risk profile, which may be unique to that market participant. Accordingly, IRS contract positions within a particular portfolio may not be consolidated without necessarily affecting not only the economic purpose intended by the market participant holding that portfolio but also the economic purposes which may be different, of any counter party market participants thereto. Accordingly, opportunities to reduce margin requirements and/or transactional fees for IRS contract portfolios are limited.

BRIEF DESCRIPTION OF THE DRAWINGS

FIGS. 5A-5C show screen shots of an exemplary web based interface for use with the disclosed embodiments.

DETAILED DESCRIPTION

Figure 1:
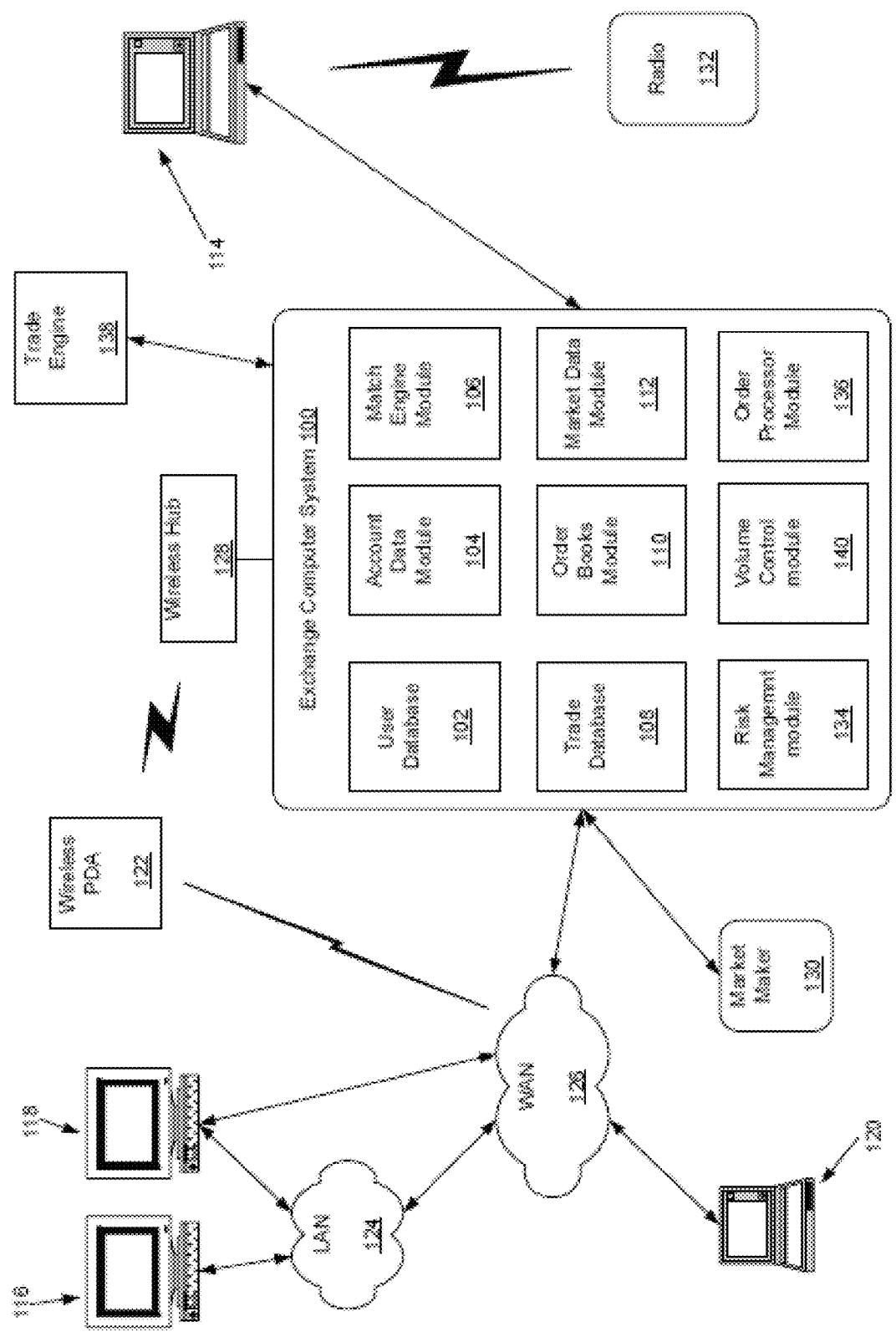
FIG. 1 depicts an illustrative computer network system that may be used to implement aspects of the disclosed embodiments.

The disclosed embodiments relate to a system for trading using a central counterparty which allows market participants to minimize risk and/or transactional fees associated with a portfolio of bilateral positions without substantially altering a risk profile thereof. In particular, the disclosed embodiments allow a market participant holding a portfolio of heterogeneous bilateral positions, such as positions in interest rate swap ("IRS") contracts, to net together similar but not identical positions within their portfolio, thereby reducing margin requirements and/or transaction fees, according to criteria specified by the market participant, and which may be different from criteria specified by other market participants, wherein the overall risk exposure desired by the market participant in entering into the positions remains substantially unchanged as does the desired overall risk exposure of the counterparty market participants to those positions.

As discussed above, an IRS is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Another common form of IRS, knows as an overnight index swap, exchanges at its termination a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap.

Generally, the disclosed embodiments relate to a match engine which nets together offsetting positions of similar but not identical positions according of counterparties therein which may have different criteria by which the positions of their portfolios are to be netted together. The disclosed embodiments be used to provide a comprehensive service, such as by the clearing house of an Exchange, that allows users to reduce the overall size and number of outstanding contacts in an IRS portfolio without changing the risk profiles of the portfolio thus potentially reducing initial margin requirements, maintenance margin requirements and transactional fees associated therewith. This results in a smaller number of trades with lower notional amounts that carries the same risk profile as the initial portfolio. Further, this system reduces the computational burden on the computational resources of the Exchange by reducing transactional, data processing and storage requirements.

Due to the nature of interest rate swap trading, a given portfolio may include a large number of individually unique positions, also referred to as line items. As these positions may be similar, but not identical, a new function for clearinghouses to net similar but not identical line items is needed. As a futures exchange, for example, CME has robust capability to allow a trader to initiate a position (buy, sell) or unwind the same a position (sell, buy). However, CME has no mechanism to group positions by similar characteristics and then eliminate overlapping line items. The capability to net non-identical line items is referred to herein as compression.

When attempting to net similar but not identical positions, it may be necessary to define the extent to which positions may be considered similar or dissimilar. As was explained above, market participants may undertake positions in IRS contracts for unique economic reasons and, accordingly, in order to ensure that their portfolio continues to serve the desired economic purpose, may have unique criteria for what positions may be considered similar, and therefore available for netting or consolidation, as which are not. Some market participants may undertake positions for which they do not want netting or consolidation to occur at all.

Compression generally reduces the notional value of economically offsetting positions without having to necessarily unwind exactly the same position that was initiated. Previous systems have employed compression generally in dealer-to-dealer trading. Given the homogeneity of the user base in existing systems, previously there was little need for systems to accommodate unique compression criteria. However, as the user base for cleared IRS grows, so too do the differences in compression criteria, and the need to pair large numbers of potentially disparate users.

Contrary thereto, for example, in CME Group's case where interest rate swaps are cleared by a central counter party for customers, the group is heterogeneous, different firms may be using different accounting for swaps within the same portfolio, and there are many customers from whom the exchange needs to collect this information simultaneously.

Further, as was described, positions in one portfolio cannot necessarily be netted or consolidated without affecting counter-positions held in the portfolios of the counterparty market participants thereto which may have different criteria for determining nettable/consolidatable positions according to their unique economic purpose. In addition, as the Exchange implements a central counterparty, each market participant may be prohibited from being privy to the portfolios and/or criteria of other market participants so as to preserve the anonymity thereof.

Accordingly, the disclosed embodiments implement a centralized compression so as to anonymously resolve nettable or consolidatable positions across portfolios according to the criteria specified by each market participant. In this manner, portfolio margin requirements and/or transactional fees associated therewith may be reduced without compromising the economic purpose desired by each trader for their portfolio. The resolution of compressible positions may further be performed in real time with respect to the affected portfolios, i.e. with respect to the contents of those portfolios as of the time of application. The compression process may be simulated to show "what if" results according to ad hoc specified compression criteria or actually implemented so as to modify the portfolio. Further, market participants can specify default, or resting, compression criteria which may be used by the disclosed embodiments to implement compression at a later time or on a periodic basis without further participant intervention, and wherein the results thereof are subsequently reported back to the associated market participants. The resting compression criteria may be different or otherwise separately specified from the ad hoc compression criteria.

In one embodiment, a web based/Internet accessible interface is provided to a centrally managed system which implements the disclosed embodiments, such as hosted by the Exchange, where market participants may view their current portfolio and specify their compression criteria. Alternatively, the disclosed embodiments may implemented in a distributed fashion where a portion of the functionality may be implemented on a computer system of the market participant. For example, a client application may be provided to the market participant, or otherwise integrated with the trading interface utilized thereby, which displays the portfolio, receives the compression criteria and otherwise enables the functionality described herein. The client application may then interface or otherwise interact with a back-end system or database of the Exchange to submit compression criteria, execute and view the results of simulated or actual compressions against the other market participant portfolios or otherwise initiate transactions therewith. It will be appreciated that the disclosed embodiments may be implemented in different ways which provide the disclosed functionality and preserve the security and anonymity of the market participants.

In one embodiment, a web interface and match engine is provided for market participants to access their portfolio to run compression scenarios. Market participants can see their whole cleared portfolio, exclude certain line items from the compression cycle, and perform what-if scenario analysis. The market participants can also see their current margin requirements, as well as how it would change depending on compression criteria.

As described above, the compression criteria, which may include for example, the maturity difference of offsetting swaps as well as the coupon difference, may be the most critical decision influencing potential margin reduction. For example, a customer may specify that they want swaps to net with maturity differences no more than 7-days difference, and 25 basis point difference in coupon, which would be relatively narrow criteria. In order for two trades to be netted that fall within those criteria, one position long and the other short, the counterpart to the trade would have to specify criteria that is at least as liberal, for example 10-days and 30 basis points different. Other compression criteria may include, but are not limited to, DV01 (a measure of risk and stands for the dollar value of a one basis point change change in yield of the reference IRS) remainder and floating rate reset maturity difference. For example, some swaps determine the floating rate reset dates by working backwards from the maturity, and some work forward from the swap effective (start) date. It will be appreciated that there may be other criteria which may be used with the disclosed embodiments, such as criteria based on other characteristics of IRS contracts and relationships therebetween, and all such criteria, now available or later developed, are contemplated herein.

The disclosed embodiment may further provide a compression match engine which then aggregates all of the customer inputs, such as in a central database, searches for suitably overlapping or otherwise correlated compression criteria, and then applies, or simulates the application of, those criteria to the portfolios. It will be appreciated that, as the compression criteria may include different criteria, each of which may be specified as a range within which compression may be acceptable to the market participant, there may multiple methods for identifying offsetting positions which may yield results of varying optimality. In one embodiment, the optimal compression is one which results in the largest reduction in the margin requirement of the portfolio within the boundaries of the specified compression criteria. Accordingly, based on the compression criteria for each counterparty, the engine may begin by characterizing each portfolio in terms of the number and size of each line position, the distribution and/or skew of the distribution. Based thereon, the engine may process the positions in each portfolio such as by beginning with biggest to smallest positions, smallest to biggest, increasing maturity, decreasing maturity, average size, etc. In one embodiment, after finding the optimal approach, as defined as the one that results in the largest drop in initial margin, the engine may store data representative of the portfolio characteristics and the search method which yielded the optimal results. In future applications, the portfolio to be compressed may then be compared with previously processed portfolios wherein the optimal compression method previous determined for a similar portfolio is tried first for the current portfolio. In this manner, the system may learn over time which compression methods are most likely to achieve optimal results for particular portfolios, further reducing the amount of speculative processing required to reach an optimal result and improving the efficiency thereof. Herein, this may be referred to as "genetic" processing.

While the disclosed embodiments may be discussed in relation to IRS contracts, it will be appreciated that the disclosed embodiments may be applicable to other bilateral contracts, equity, options or futures trading system or market now available or later developed.

It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the Exchange computer system 100 further includes a risk management module 134 which may implement the disclosed mechanisms as will be described with reference to FIG. 2. It will be appreciated the disclosed embodiments may be implemented separate module or a separate computer system coupled with the Exchange computer system 100 so as to have access to the requisite portfolio data. As described above, the disclosed embodiments may be implemented as a centrally accessible system or as a distributed system where some of the disclosed functions are performed by the computer systems of the market participants.

Figure 2:
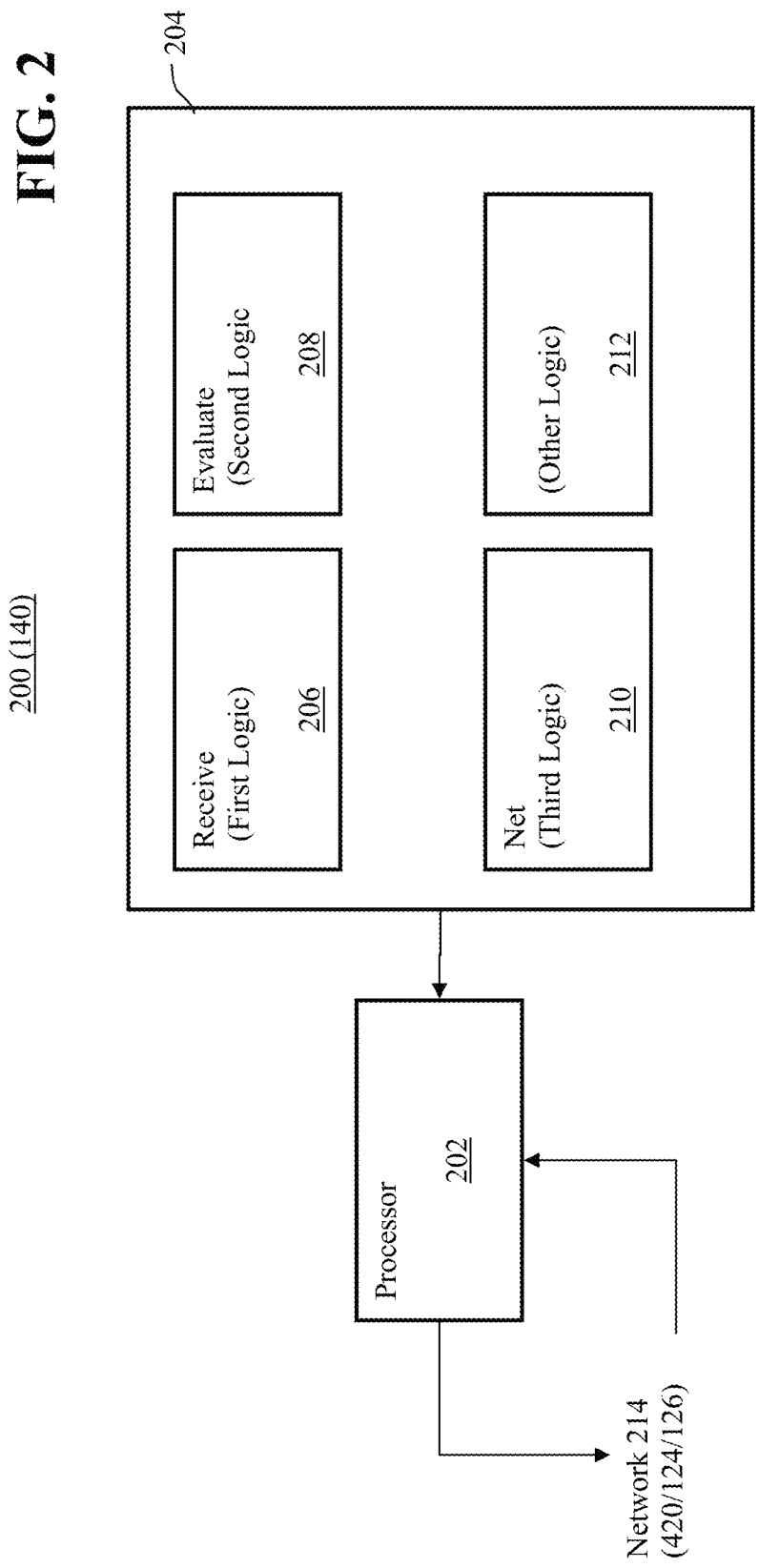
FIG. 2 a block diagram of an exemplary implementation of the system of FIG. 1 for netting a plurality of offsettable positions of a plurality of positions within each of a plurality of portfolios according to the disclosed embodiments.

FIG. 2 depicts a block diagram of a risk management module 140 according to one embodiment, which in an exemplary implementation, is implemented as part of the exchange computer system 100 described above. As used herein, an exchange 100 includes a place or system that receives and/or executes orders.

In particular, FIG. 2 shows a system 200 for netting a plurality of offsettable positions of a plurality of positions within each of a plurality of portfolios, each of the plurality of portfolios being associated with a market participant wherein the plurality of positions of one of the plurality of portfolios may be different from the plurality of positions of at least one other of the plurality of portfolios. The netting may reduce a margin requirement, reflective of a reduction of risk, and/or transactional fees, reflective of a consolidation of positions, associated with one or more of the plurality of portfolios. The system 200 does not reveal the identities of the market participants to each other. In one embodiment, at least one of the plurality of positions may include a position in an interest rate swap contract. Further, The system 200 includes a processor 202 and a memory 204 coupled therewith which may be implemented a processor 402 and memory 404 as described below with respect to FIG. 4. The system 200 further includes first logic 206 stored in the memory 204 and executable by the processor 202 to cause the processor 202 to receive, such as via a network 214 coupled therewith, from each market participant, criteria data representative of a plurality of conditions by which the associated market participant considers any of the plurality of positions of their associated portfolio as being an offsettable position with respect to another of the plurality of positions of their associated portfolio, wherein the criteria data received from one market participant is different from the criteria data received from at least one other market participant.

In one embodiment, wherein each position of the plurality of positions of each portfolio is characterized by a maturity, a coupon, and a measure of risk, the plurality of conditions may include a maximum difference between the maturity of at least two of the plurality of positions within the associated portfolio, a minimum difference between the maturity of at least two of the plurality of positions within the associated portfolio, a maximum difference between the coupons of at least two of the plurality of positions within the associated portfolio, a minimum difference between the coupons of at least two of the plurality of positions within the associated portfolio, a maximum difference between the measure of risk of at least two of the plurality of positions within the associated portfolio, a minimum difference between the measure of risk of at least two of the plurality of positions within the associated portfolio, or combinations thereof. Alternatively, or in addition thereto, the plurality of conditions may include an exclusion of at least one position of the plurality of positions from being considered an offsettable position.

The system 200 further includes second logic 208 stored in the memory 204 and executable by the processor 202 to cause the processor 202 to evaluate each of the received criteria data to determine whether, for a first portfolio of the plurality of portfolios of a first market participant of the plurality of market participants from which the criteria data was received, at least first and second positions included in the first portfolio and considered offsettable under the plurality of conditions of the criteria data received from the first market participant would further be considered offsettable positions under the plurality of conditions of another criteria data received from a second market participant associated with a second portfolio of the plurality of portfolios which includes at least a third position counter to the first position and a fourth position counter to the second position and considered offsettable under the plurality of conditions of the criteria data received from the second market participant and wherein the third and fourth positions are further considered offsettable positions under the plurality of conditions of the criteria data received from the first market participant.

In one embodiment, the netting is simulated. Alternatively, the positions of the portfolios, e.g. the first and second portfolios, may be modified as a result of the netting. In one embodiment, a market participant may choose whether to simulate netting or actually apply the results thereof to their portfolio.

In one embodiment, the system 200 may further include tenth logic 212 stored in the memory 204 and executable by the processor 202 to cause the processor 202 to periodically, e.g. automatically on a periodic basis, execute the second 208 and third logic 210 and report the results to at least the first and second market participants. The periodic execution may be based on the criteria data previously provided by the market participants.

In one embodiment, the system 200 may further include eleventh logic 212 stored in the memory 204 and executable by the processor 202 to cause the processor 202 to execute the second 208 and third logic 210 upon request of the first market participant. For example, a market participant may access the system 200 to perform simulations whereby they alter the criteria data and request execution based thereon to test different criteria data.

Figure 5A:
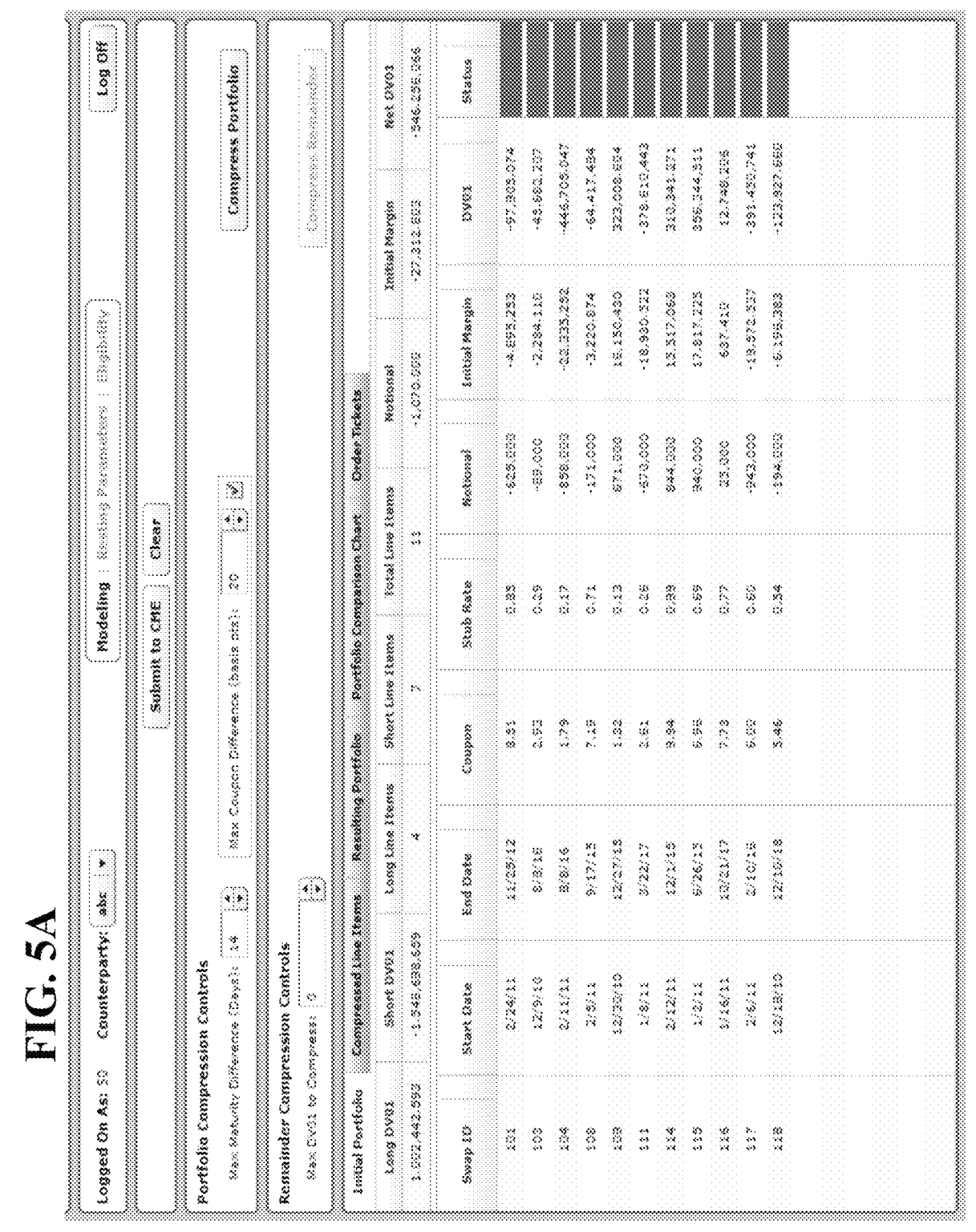
Figure 5B:
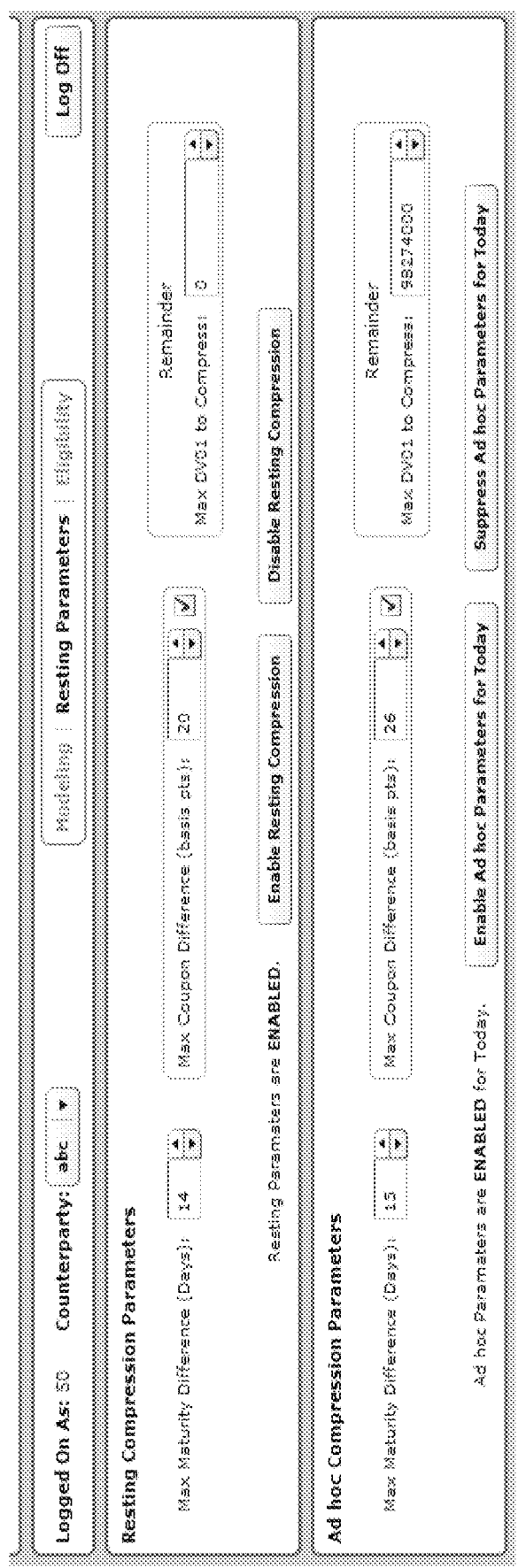
Figure 5C:
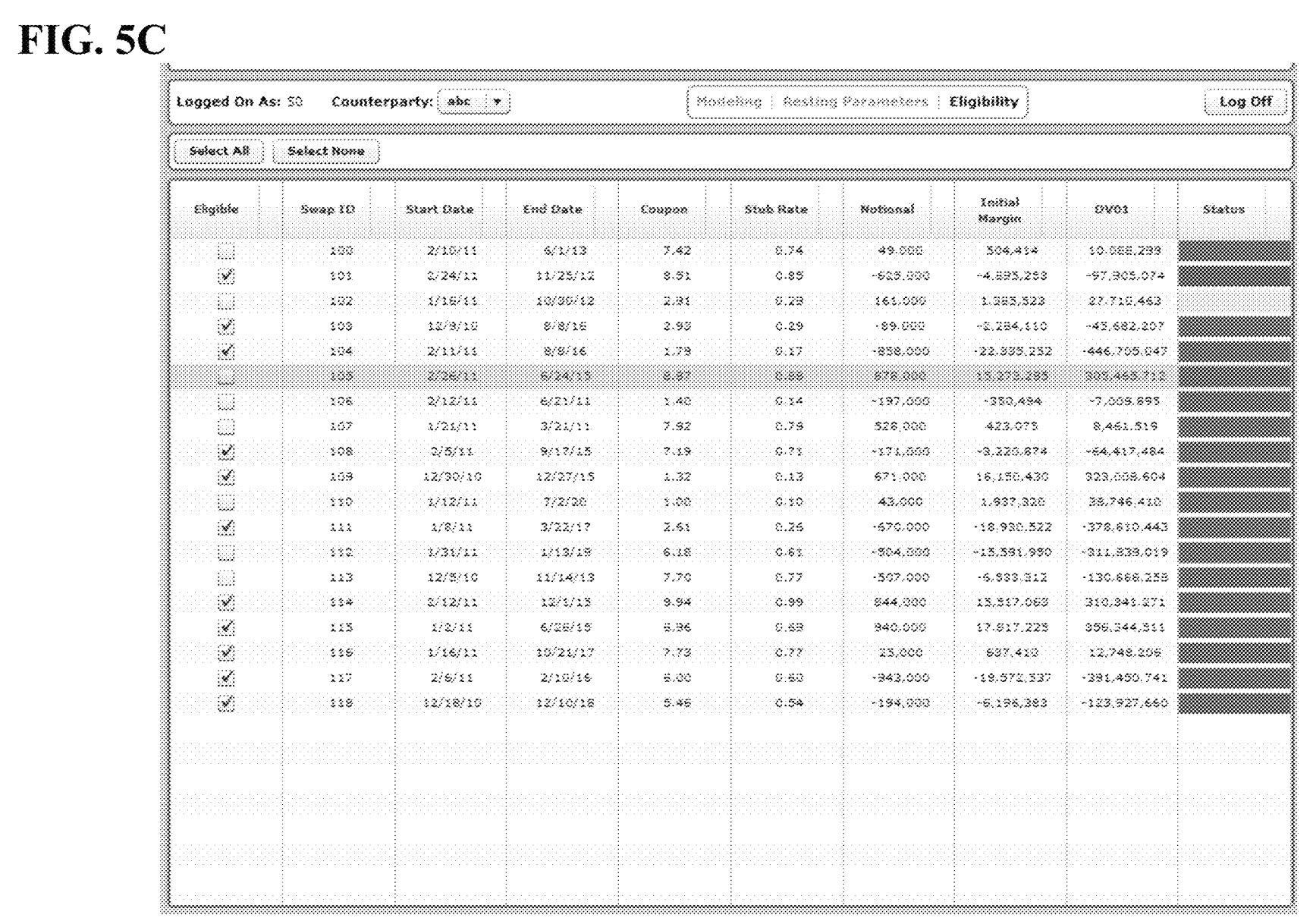

In one embodiment, the system 200 may further include twelfth logic 212 stored in the memory 204 and executable by the processor 202 to cause the processor 202 to provide a graphic user interface via which the criteria data is received and results of the netting are presented. In one implementation, the graphic user interface comprises a web based interface comprising one or more web page. FIGS. 5A-5C show screen shots of an exemplary web based interface for use with the disclosed embodiments.

The system 200 further includes third logic 210 stored in the memory 204 and executable by the processor 202 to cause the processor 202 to net the first position with the second position and the third position with the fourth position, when the first and second positions and the third and fourth positions are determined to be considered offsettable positions under the plurality of conditions of both the criteria data received from the first market participant and the criteria data received from the second market participant.

In one embodiment, wherein the first position may be considered further offsettable against a fifth position of the first portfolio under the plurality of conditions of both the criteria data received from the first and second market participants, the fifth position being counter to a sixth position of the second portfolio considered to be offsettable against the third position under the plurality of conditions of both the criteria data received from the first and second market participants, the system 200 may further include: fourth logic 212 stored in the memory 204 and executable by the processor 202 to cause the processor 202 to determine whether netting the first position with the second position is more optimal than netting the first position with the fifth position; and wherein the third logic 210 is further executable by the processor 202 to cause the processor 202 to net the first position with the second or fifth position based thereon.

Further, the fourth logic 212 may be further executable by the processor 202 to cause the processor 202 to compute a first margin requirement for the first portfolio based on the netting of the first and second positions and compute a second margin requirement for the first portfolio based on the netting of the first and fifth positions, wherein the netting of the first and second positions is determined to be more optimal if the first margin requirement is less than the second margin requirement.

Alternatively, or in addition thereto, the fourth logic 212 may be further executable by the processor 202 to cause the processor 202 to evaluate the first position in different orderings against the second and fifth positions, the different orderings being based on a size of the second and fifth positions or maturity date of the second and fifth positions. In one embodiment, the system 200 may further include fifth logic 212 stored in the memory 204 and executable by the processor 202 to cause the processor 202 to, prior to the evaluation of the first position in the different orderings, characterize each of the first and second portfolios in terms of a number and size of each of the plurality of positions thereof and further, the distribution and skew thereof.

In one embodiment, the system 200 may further include: sixth logic 212 stored in the memory 204 and executable by the processor 202 to cause the processor 202 to store in the memory 204, data representative of the first portfolio along with data indicative of which ordering of the different orderings resulted in the more optimal netting; seventh logic 212 stored in the memory 204 and executable by the processor 202 to cause the processor 202 to receive a third portfolio; eighth logic 212 stored in the memory 204 and executable by the processor 202 to cause the processor 202 to access the memory 204 to determine if the third portfolio is similar to the first portfolio based on the stored data representative thereof; and ninth logic 212 stored in the memory 204 and executable by the processor 202 to cause the processor 202 to evaluate offsettable positions of the third portfolio in the ordering indicated by the data indicative of the order which resulted in the more optimal netting for the first portfolio prior to other of the different orderings, when it is determined that the first and third portfolios are similar.

Figure 3:
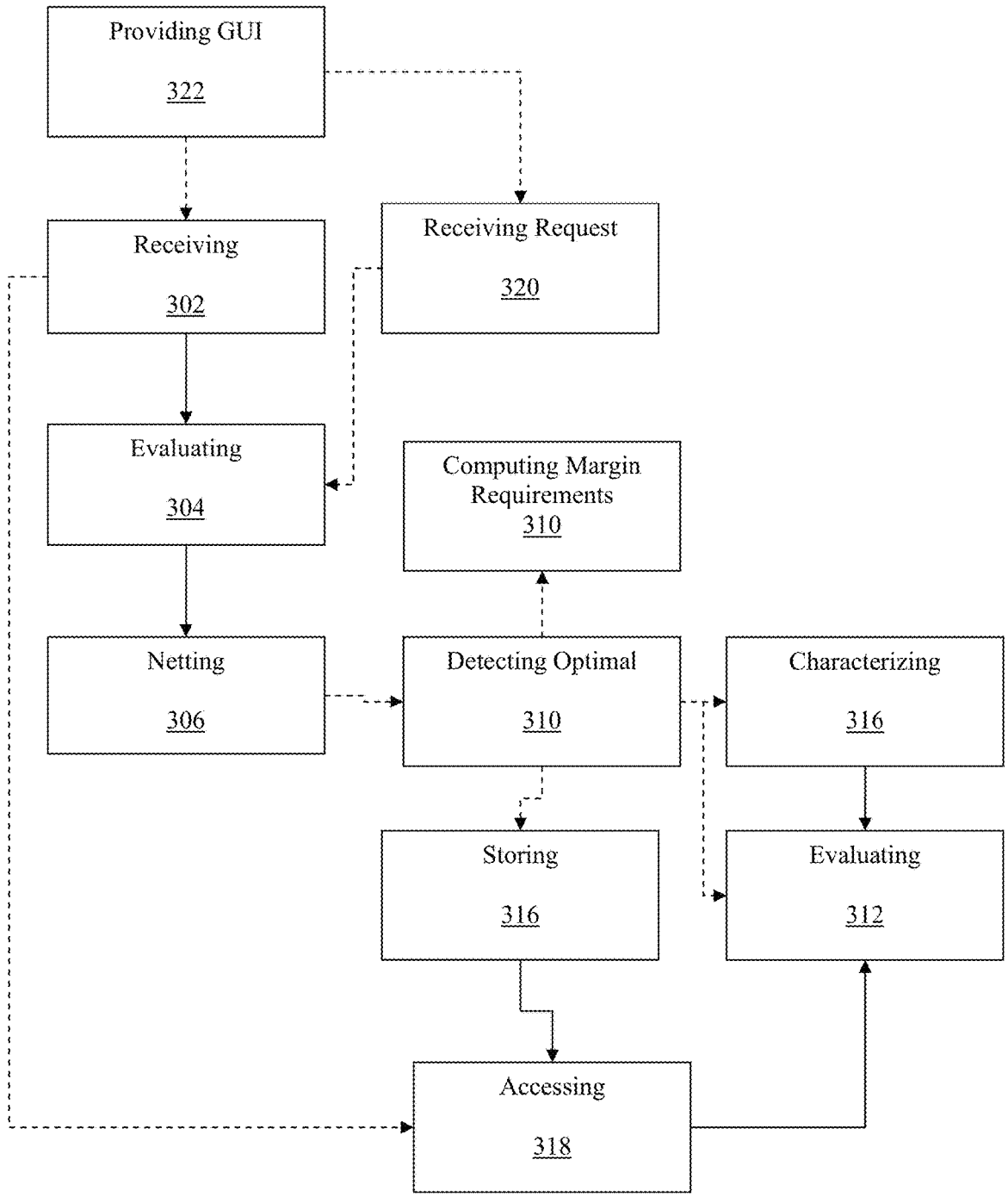
FIG. 3 depicts a flow chart showing operation of the system of FIGS. 1 and 2.

FIG. 3 depicts a flow chart showing operation of the system 200 of FIG. 2. In particular FIG. 3 shows a computer implemented method for netting a plurality of offsettable positions of a plurality of positions within each of a plurality of portfolios, each of the plurality of portfolios being associated with a market participant. The operation of the system 200 includes: receiving, by a processor from each market participant, criteria data representative of a plurality of conditions by which the associated market participant considers any of the plurality of positions of their associated portfolio as being an offsettable position with respect to another of the plurality of positions of their associated portfolio, wherein the criteria data received from one market participant is different from the criteria data received from at least one other market participant [block 302]; evaluating, by the processor, each of the received criteria data to determine whether, for a first portfolio of the plurality of portfolios of a first market participant of the plurality of market participants from which the criteria data was received, at least first and second positions included in the first portfolio and considered offsettable under the plurality of conditions of the criteria data received from the first market participant would further be considered offsettable positions under the plurality of conditions of another criteria data received from a second market participant associated with a second portfolio of the plurality of portfolios which includes at least a third position counter to the first position and a fourth position counter to the second position and considered offsettable under the plurality of conditions of the criteria data received from the second market participant and wherein the third and fourth positions are further considered offsettable positions under the plurality of conditions of the criteria data received from the first market participant [block 304]; and netting, by the processor, the first position with the second position and the third position with the fourth position, when the first and second positions and the third and fourth positions are determined to be considered offsettable positions under the plurality of conditions of both the criteria data received from the first market participant and the criteria data received from the second market participant [block 306].

At least one of the plurality of positions may include a position in an interest rate swap contract. The plurality of positions of one of the plurality of portfolios may be different from the plurality of positions of at least one other of the plurality of portfolios. In one embodiment, wherein each position of the plurality of positions of each portfolio is characterized by a maturity, a coupon, and a measure of risk, the plurality of conditions may include a maximum difference between the maturity of at least two of the plurality of positions within the associated portfolio, a minimum difference between the maturity of at least two of the plurality of positions within the associated portfolio, a maximum difference between the coupons of at least two of the plurality of positions within the associated portfolio, a minimum difference between the coupons of at least two of the plurality of positions within the associated portfolio, a maximum difference between the measure of risk of at least two of the plurality of positions within the associated portfolio, a minimum difference between the measure of risk of at least two of the plurality of positions within the associated portfolio, or combinations thereof. It will be appreciated that there may be other conditions as well. For example, the plurality of conditions may include an exclusion of at least one position of the plurality of positions from being considered an offsettable position.

In one embodiment, the netting is simulated. Alternatively, or in addition thereto, the positions in the first and second portfolios are modified according to the netting. The netting may result in at least a reduction of a margin requirement of the first portfolio.

In one embodiment, the evaluating and netting are periodically performed, such as on a schedule or cycle and the results are reported to at least the first and second market participants. Alternatively, or in addition thereto, the evaluating and netting may be performed upon request of the first market participant [block 320].

In one embodiment, a graphic user interface may be provided, such as a web based interface, via which the criteria data is received and results of the netting are presented [block 322].

In one embodiment wherein the first position may be considered further offsettable against a fifth position of the first portfolio under the plurality of conditions of both the criteria data received from the first and second market participants, the fifth position being counter to a sixth position of the second portfolio considered to be offsettable against the third position under the plurality of conditions of both the criteria data received from the first and second market participants, the operation of the system 200 may further include: determining, by the processor, whether netting the first position with the second position is more optimal than netting the first position with the fifth position [block 308]; and netting, by the processor, the first position with the second or fifth position based thereon [block 306].

In one embodiment, the determining may further include computing, by the processor, a first margin requirement for the first portfolio based on the netting of the first and second positions and computing, by the processor, a second margin requirement for the first portfolio based on the netting of the first and fifth positions, wherein the netting of the first and second positions is determined to be more optimal if the first margin requirement is less than the second margin requirement [block 310].

In one embodiment, the determining may further include evaluating, by the processor, the first position in different orderings against the second and fifth positions, the different orderings being based on a size of the second and fifth positions or maturity date of the second and fifth positions [block 312].

In one embodiment, prior to the evaluating of the first position in the different orderings, the operation of the system 200 may further include characterizing each of the first and second portfolios in terms of a number and size of each of the plurality of positions thereof and further, the distribution and skew thereof [block 314].

In on embodiment, the operation of the system 200 further includes: storing, by the processor in a memory coupled therewith, data representative of the first portfolio along with data indicative of which ordering of the different orderings resulted in the more optimal netting [block 316]; receiving, by the processor, a third portfolio [block 302]; accessing, by the processor, the memory to determine if the third portfolio is similar to the first portfolio based on the stored data representative thereof [block 318]; and evaluating, by the processor, offsettable positions of the third portfolio in the ordering indicated by the data indicative of the order which resulted in the more optimal netting for the first portfolio prior to other of the different orderings, when it is determined that the first and third portfolios are similar [block 312].

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

Figure 4:
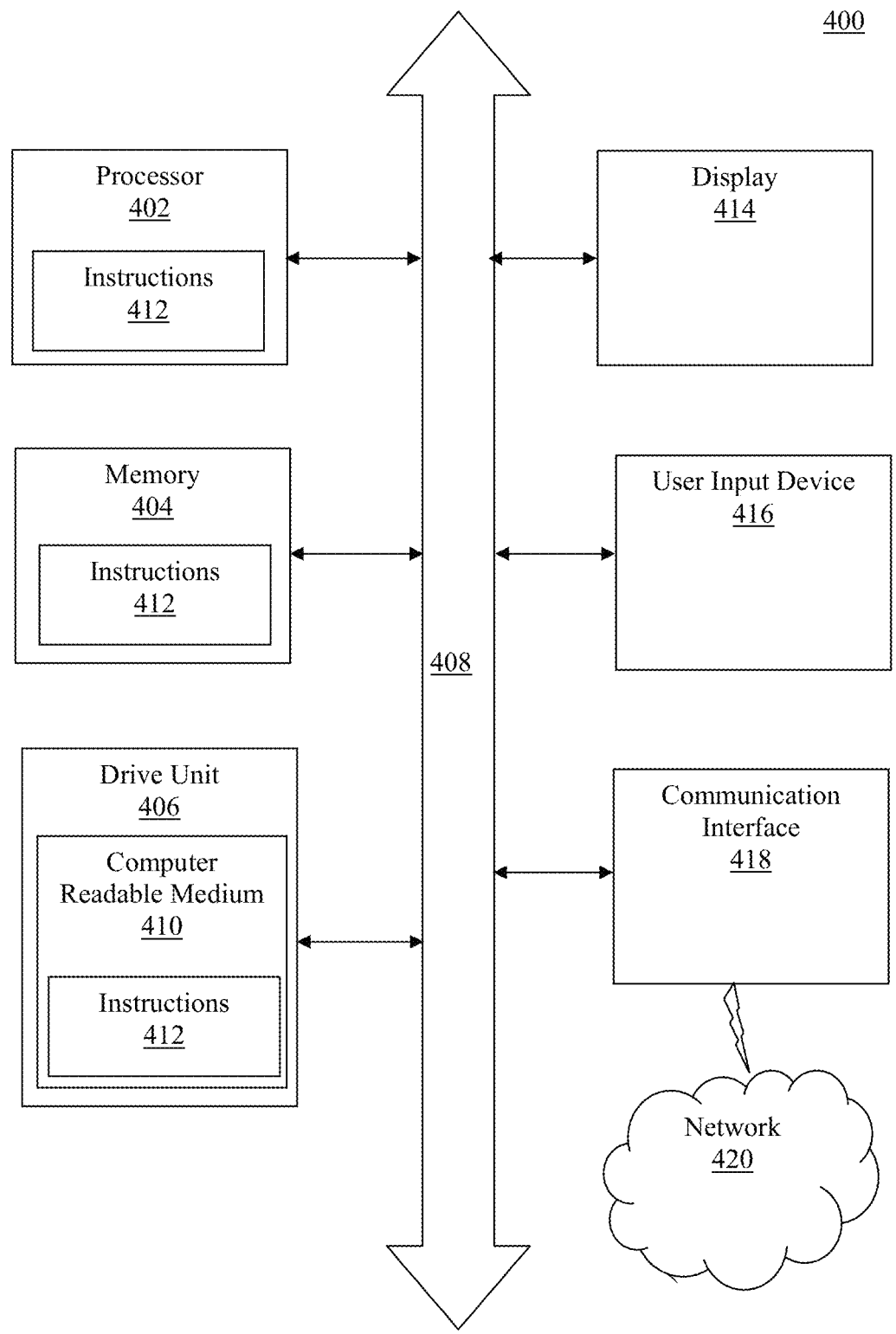
FIG. 4 shows an illustrative embodiment of a general computer system for use with the system of FIGS. 1 and 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for automatically reducing a number of data records indicative of similar but not identical positions stored in a portfolio database, and thereby consuming space therein, in a data transaction processing system in which data items are transacted by a hardware matching processor that anonymously matches electronic data transaction request messages for the same one of the data items based on multiple transaction parameters from different client computers of different market participants over a data communication network without identifying those market participants to each other, the positions stored in the portfolio database having resulted from the anonymous matching of one or more electronic data transaction request messages, the similarity not being determinable by the data transaction processing system, the method comprising:

receiving, by the data transaction processing system, first criteria from a first market participant, the first criteria identifying to the data transaction processing system conditions otherwise unknown thereto according to which two or more non-identical positions of a first plurality of positions within a first portfolio stored in the portfolio database associated with the first market participant are regarded as being similar and therefore consolidatable or offsettable against each other, wherein the first portfolio is characterized by a first risk profile that is a function of the first plurality of positions;

receiving, by the data transaction processing system independent of the receipt of the first criteria, second criteria from a second market participant, the second criteria identifying to the data transaction processing system conditions otherwise unknown thereto according to which two or more non-identical positions of a second plurality of positions within a second portfolio stored in the portfolio database associated with the second market participant are regarded as being similar and therefore consolidatable or offsettable against each other, wherein the second portfolio is characterized by a second risk profile that is a function of the second plurality of positions;

identifying, by the data transaction processing system wherein the first and second market participants are unable to do so, that at least one position of the two or more non-identical positions within the second portfolio represents a counter position to at least one position of the two or more non-identical positions within the first portfolio, and therefore, unbeknownst to both the first and second market participants, the at least one position of the second portfolio and the at least one position of the first portfolio cannot be removed from the first or second portfolio without affecting the other; and resolving, automatically by the data transaction processing system without identifying the first and second market participants to each other, the two or more non-identical positions within the first portfolio and/or within the second portfolio based on the first criteria and the second criteria defining those positions to the data transaction processing system as being similar to identify at least one of the two or more non-identical positions of the first portfolio and/or the second portfolio that may be consolidated with or offset against the other of the two or more non-identical positions of the first portfolio and/or the second portfolio; and deleting from the portfolio database, by the data transaction processing system based on the resolving, the data record of the identified at least one position of the first and/or second portfolios, a data size of the first and/or second portfolio stored in the portfolio database being reduced thereby while a risk profile, as a function of remaining positions in the first and/or second portfolio, is identical to the first or second risk profiles respectively, a computational burden on transactional, data processing and storage requirements being reduced thereby to less than such a burden would be for the unmodified first and/or second portfolios.

2. The computer-implemented method of claim 1 wherein the first criteria and the second criteria are different.

3. The computer-implemented method of claim 1 wherein the resolving comprises netting, consolidating, or a combination of both.

4. The computer-implemented method of claim 1 wherein at least one position in the first portfolio and/or the second portfolio comprises a position in an interest rate swap contract.

5. The computer-implemented method of claim 1 wherein the first criteria define conditions according to which a plurality of non-identical positions within the first portfolio are regarded as being consolidatable or offsettable, and wherein the second criteria define conditions according to which a plurality of non-identical positions within the second portfolio are regarded as being consolidatable or offsettable.

6. The computer-implemented method of claim 1 wherein the resolving is performed through an Exchange acting as a central counterparty.

7. The computer-implemented method of claim 1 wherein the resolving is simulated.

8. The computer-implemented method of claim 1 wherein each of the non-identical positions in the first portfolio and the second portfolio is characterized by a maturity, a coupon, and a measure of risk.

9. The computer-implemented method of claim 8, wherein the conditions defined by the first criteria and the conditions defined by the second criteria are each independently selected from the group consisting of a maximum difference between the maturity of at least two non-identical positions within a common portfolio, a minimum difference between the maturity of at least two non-identical positions within a common portfolio, a maximum difference between the coupons of at least two non-identical positions within a common portfolio, a minimum difference between the coupons of at least two non-identical positions within a common portfolio, a maximum difference between the measure of risk of at least two non-identical positions within a common portfolio, a minimum difference between the measure of risk of at least two non-identical positions within a common portfolio, and combinations thereof.

10. The computer-implemented method of claim 1 further comprising receiving, by the processor, an additional set of criteria from an additional market participant, the additional set of criteria defining conditions according to which two or a plurality of groups of non-identical positions within a portfolio associated, respectively, with the additional market participant is regarded as being consolidatable or offsettable.

11. The computer-implemented method of claim 1 wherein a plurality of nettable and/or consolidatable non-identical positions are resolved within the first portfolio, and wherein a plurality of nettable and/or consolidatable non-identical positions are resolved within the second portfolio.

12. The computer-implemented method of claim 1 wherein the first criteria and/or the second criteria independently comprises an exclusion of at least one position within, respectively, the first portfolio and/or the second portfolio from being eligible for consolidating or offsetting.

13. A system for automatically reducing a number of data records indicative of similar but not identical positions stored in a portfolio database, and thereby consuming space therein, in a data transaction processing system in which data items are transacted by a hardware matching processor that matches electronic data transaction request messages for the same one of the data items based on multiple transaction parameters from different client computers of different market participants over a data communication network without identifying those market participants to each other, the positions stored in the portfolio database having resulted from the anonymous matching of one or more electronic data transaction request messages, the similarity not being determinable by the data transaction processing system, the system comprising:

a processor;
a memory coupled with the processor;
first logic stored in the memory and executable by the processor to cause the processor to receive first criteria from a first market participant, the first criteria identifying to the data transaction processing system conditions otherwise unknown thereto according to which two or more non-identical positions of a first plurality of positions within a first portfolio stored in the portfolio database associated with the first market participant are regarded as being similar and therefore consolidatable or offsettable against each other, wherein the first portfolio is characterized by a first risk profile that is a function of the first plurality of positions;

second logic stored in the memory and executable by the processor to cause the processor, independent of the receipt of the first criteria, to receive second criteria from a second market participant, the second criteria received, by the data transaction processing system independent of the receipt of the first criteria, the second criteria identifying to the data transaction processing system conditions otherwise unknown thereto according to which two or more non-identical positions of a second plurality of positions within a second portfolio stored in the portfolio database associated with the second market participant are regarded as being similar and therefore consolidatable or offsettable against each other, wherein the second portfolio is characterized by a second risk profile that is a function of the second plurality of positions, the second logic being further executable by the processor to cause the processor to identify wherein the first and second market participants are unable to do so, that at least one position of the two or more non-identical positions within the second portfolio represents a counter position to at least one position of the two or more non-identical positions within the first portfolio, and therefore, unbeknownst to both the first and second market participants, the at least one position of the second portfolio and the at least one position of the first portfolio cannot be removed from the first or second portfolio without affecting the other; and third logic stored in the memory and executable by the processor to cause the processor to automatically resolve, without identifying the first and second market participants to each other, the two or more non-identical positions within the first portfolio and/or within the second portfolio based on the first criteria and the second criteria defining those positions to the data transaction processing system as being similar to identify at least one of the two or more non-identical positions of the first portfolio and/or the second portfolio that may be consolidated with or offset against the other of the two or more non-identical positions of the first portfolio and/or the second portfolio and wherein the third logic is further executable by the processor to cause the processor, based on the resolution, to delete, from the portfolio database, the data record of the identified at least one position of the first and/or second portfolios, a data size of the first and/or second portfolio stored in the portfolio database being reduced thereby while a risk profile, as a function of remaining positions in the associated portfolio, is identical to the first or second risk profiles respectively, a computational burden on transactional, data processing and storage requirements being reduced thereby to less than such a burden would be for the unmodified first and/or second portfolios.

14. The system of claim 13 wherein at least one position in the first portfolio and/or the second portfolio comprises a position in an interest rate swap contract.

15. The system of claim 14 wherein each of the non-identical positions in the first portfolio and the second portfolio is characterized by a maturity, a coupon, and a measure of risk.

16. The system of claim 15, wherein the conditions defined by the first criteria and the conditions defined by the second criteria are each independently selected from the group consisting of a maximum difference between the maturity of at least two non-identical positions within a common portfolio, a minimum difference between the maturity of at least two non-identical positions within a common portfolio, a maximum difference between the coupons of at least two non-identical positions within a common portfolio, a minimum difference between the coupons of at least two non-identical positions within a common portfolio, a maximum difference between the measure of risk of at least two non-identical positions within a common portfolio, a minimum difference between the measure of risk of at least two non-identical positions within a common portfolio, and combinations thereof.

17. The system of claim 13 further comprising fourth logic stored in the memory and executable by the processor to cause the processor to receive an additional set of criteria from an additional market participant, the additional set of criteria defining conditions according to which two or a plurality of groups of non-identical positions within a portfolio associated, respectively, with the additional market participant is regarded as being consolidatable or offsettable.

18. A system for automatically reducing a number of data records indicative of similar but not identical positions stored in a portfolio database, and thereby consuming space therein, in a data transaction processing system in which data items are transacted by a hardware matching processor that anonymously matches electronic data transaction request messages for the same one of the data items based on multiple transaction parameters from different client computers of different market participants over a data communication network without identifying those market participants to each other, the positions stored in the portfolio database having resulted from the anonymous matching of one or more electronic data transaction request messages, the similarity not being determinable by the data transaction processing system, the system comprising:

means for receiving first criteria from a first market participant, the first criteria identifying to the data transaction processing system conditions otherwise unknown thereto according to which two or more non-identical positions of a first plurality of positions within a first portfolio stored in the portfolio database associated with the first market participant are regarded as being similar and therefore consolidatable or offsettable against each other, wherein the first portfolio is characterized by a first risk profile that is a function of the first plurality of positions;

means for receiving second criteria from a second market participant independent of the receipt of the first criteria, the second criteria identifying to the data transaction processing system conditions otherwise unknown thereto according to which two or more non-identical positions of a second plurality of positions within a second portfolio stored in the portfolio database associated with the second market participant are regarded as being similar and therefore consolidatable or offsettable against each other, wherein the second portfolio is characterized by a second risk profile that is a function of the second plurality of positions;

means for identifying, by the data transaction processing system wherein the first and second market participants are unable to do so, that at least one position of the two or more non-identical positions within the first portfolio, and therefore, unbeknownst to both the first and second market participants, the at least one position of the second portfolio and the at least one position of the first portfolio cannot be removed from the first or second portfolio without affecting the other; and means for automatically resolving, without identifying the first and second market participants to each other, the two or more non-identical positions within the first portfolio and/or within the second portfolio based on the first criteria and the second criteria defining those positions to the data transaction processing system as being similar to identify at least one of the two or more non-identical positions of the first portfolio and/or the second portfolio that may be consolidated with or offset against the other of the two or more non-identical positions of the first portfolio and/or the second portfolio; and means for deleting from the portfolio database, based on the resolving, the data record of the identified at least one position of the first and/or second portfolio, a data size of the first and/or second portfolio stored in the portfolio database being reduced thereby while a risk profile, as a function of remaining positions in the associated portfolio, is identical to the first or second risk profiles respectively, a computational burden on transactional, data processing and storage requirements being reduced thereby to less than such a burden would be for the unmodified first and/or second portfolios.

* * * * *